US012662355B2

(12) United States Patent
Tao et al.

(10) Patent No.: US 12,662,355 B2
(45) Date of Patent: Jun. 23, 2026

(54) POSITION SENSOR FOR ESCALATORS AND MOVING WALKWAYS

(71) Applicant: Inventio AG, Hergiswil (CH)

(72) Inventors: Yunzheng Tao, Shanghai (CN); Lisa Liu, Shanghai (CN); Zane Chen, Shanghai (CN)

(73) Assignee: Inventio AG, Hergiswil (CH)

( * ) Notice: Subject to any disclaimer, the term of this patent is extended or adjusted under 35 U.S.C. 154(b) by 66 days.

(21) Appl. No.: 18/853,264

(22) PCT Filed: Apr. 19, 2023

(86) PCT No.: PCT/EP2023/060078

§ 371 (c)(1),
(2) Date: Oct. 1, 2024

(87) PCT Pub. No.: WO2023/203050

PCT Pub. Date: Oct. 26, 2023

(65) Prior Publication Data

US 2025/0250144 A1 Aug. 7, 2025

(30) Foreign Application Priority Data

Apr. 21, 2022 (EP) .................................... 22169138

(51) Int. Cl.
*B66B 29/02* (2006.01)
*B66B 29/04* (2006.01)

(52) U.S. Cl.
CPC .............. *B66B 29/02* (2013.01); *B66B 29/04* (2013.01)

(58) Field of Classification Search
CPC ................................ B66B 29/02; B66B 29/04
(Continued)

(56) References Cited

U.S. PATENT DOCUMENTS 4,924,995 A * 5/1990 Adrian .................... B66B 29/04 198/338
4,976,345 A * 12/1990 Adrian .................... B66B 29/04 198/338
(Continued)

FOREIGN PATENT DOCUMENTS

DE 3629650 A1 * 3/1988 ........... H01H 13/183
DE 202011000818 U1 * 10/2011 ............ B66B 29/02
(Continued)

OTHER PUBLICATIONS

International Search Report issued in application No. PCT/EP2023/060078 on Jun. 6, 2023.

*Primary Examiner* — James R Bidwell
(74) *Attorney, Agent, or Firm* — Knobbe, Martens, Olson & Bear, LLP

(57) ABSTRACT

The disclosure relates to a position switch biasing device for a position switch having a button element that is displaceable in a first direction. The position switch biasing device comprises a fastening element for fastening to the position switch and comprises a biasing element. The biasing element is connected to the fastening element so as to be linearly displaceable and is adapted to the position switch in such a way that, when a position switch biasing device is mounted on the position switch, the biasing element of the biasing device is movable telescopically in the first direction of the button element. The biasing element holds the button element of the position switch in a partially indented, biased state without the application of external force.

20 Claims, 6 Drawing Sheets

(58) Field of Classification Search
USPC .......................................................... 198/323
See application file for complete search history.

(56) References Cited

U.S. PATENT DOCUMENTS

| | | | | |
|---|---|---|---|---|
| 5,307,918 | A * | 5/1994 | Rivera .................... | B66B 29/02 198/323 |
| 6,405,847 | B1 | 6/2002 | Cook et al. | |
| 2008/0164118 | A1 * | 7/2008 | Gonzalez Alemany ..................... | B66B 29/02 198/322 |
| 2012/0018291 | A1 * | 1/2012 | Wang ................. | H01H 13/7057 200/5 R |

FOREIGN PATENT DOCUMENTS

| | | | | |
|---|---|---|---|---|
| DE | 102019101265 | A1 * | 7/2020 | ............. H01H 13/56 |
| EP | 0420061 | A2 * | 4/1991 | ............. B66B 29/04 |
| JP | S6093088 | A | 5/1985 | |
| JP | H11209054 | A | 8/1999 | |
| JP | 2013-107734 | A | 6/2013 | |
| WO | WO 2021/210036 | A1 | 10/2021 | |

* cited by examiner

POSITION SENSOR FOR ESCALATORS AND MOVING WALKWAYS

TECHNICAL FIELD

The present disclosure relates to a position sensor for escalators and moving walkways and in particular to a biasing device for a position switch of such a position sensor.

SUMMARY

As efficient means of transportation, escalators and moving walkways are often used in buildings such as airports, railway stations, subway stations, shopping malls and department stores. The requirements for the operational safety of such passenger conveyor systems are very high, because the personal safety of their users must be ensured. It is therefore particularly important to monitor the escalator's running state in real time. A critical region in escalators or moving walkways is a gap between their conveyor belt and a base plate, arranged laterally relative to the conveyor belt, of the balustrade base arranged on both sides of the conveyor belt. To monitor the gap, position switches can be used, as disclosed in U.S. Pat. No. 6,405,847 B1, which are intended to detect whether the base plate is deformed transversely to the direction of travel under an action of force and therefore a widening of the gap occurs. This indicates that, for example, an item or even a user's limbs are drawn into this gap, for which reason the escalator or moving walkway must be stopped immediately.

However, it was found that the commercially available position switches used to monitor the base plate are not sensitive enough and therefore do not emit a contact signal if the base plate is only slightly deformed. This poses a certain safety risk. There are in fact also known solutions with optical detection systems that can detect deformation of the base plate. However, the installation space is often lacking to retrofit an optical detection system to an existing escalator that is equipped with commercially available position switches. In addition, such systems are expensive and potentially susceptible to contamination.

The object of the present disclosure is to minimize the aforementioned safety risk. It should also be possible to use commercially available position switches here.

This object can be achieved by a position switch biasing device for a position switch, by a position sensor with a position switch and such a position switch biasing device and by an escalator or a moving walkway with such a position sensor. The position switch can comprise a button element that is displaceable in a first direction. The button element can be held in an OFF switch position with a spring element acting against the first direction.

If the button element is subjected to a force acting in the first direction and against the spring element, the button element can be moved from its OFF position (switch path open) to an ON position (switch path closed).

The position switch biasing device can comprise a fastening element for fastening it to a position switch and a biasing element which is connected to the fastening element so as to be linearly displaceable. In this case, the biasing device can be adapted to the position switch in such a way that, when a position switch biasing device is mounted on the position switch, the biasing element is movable telescopically in the first direction of the button element. The biasing element can hold the position switch's button element in a partially indented, biased state even without the application of external force.

In other words, a position sensor can be created by assembling a conventional position switch with a position switch biasing device. Due to this assembly, the button element can be pressed by the position switch biasing device into the switch housing of the position switch to a predetermined press-in depth, so that the required travel path of the position switch to its ON position may be shortened. This may make it possible to significantly increase the sensitivity of a conventional position switch so that the position switch is triggered even when the degree of deformation of the item to be tested is small. By arranging a telescopically displaceable biasing element and the fastening element on the position switch, the button element of the position switch can be given an initial press-in depth.

In one embodiment of the present disclosure, the biasing element can comprise at least one guide lug. The at least one guide lug can be connected to the fastening element so as to be linearly displaceable. Furthermore, the guide lug can comprise a guide lug projection which, in interaction with a stop surface of the fastening element, can predetermine a maximum distance of the biasing element relative to the fastening element. In other words, the guide lug projection and the stop surface can form a mechanical stop. This can prevent the biasing element from being removed from the fastening element or from being pushed away from the spring element of the position switch beyond this maximum distance.

In a further embodiment of the present disclosure, the biasing element can comprise a frustoconical top surface and a frustoconical lateral surface. These can be designed on the side of the biasing element facing away from the fastening element. The use of the frustoconical top surface with a smaller area for contacting the item under test or the base plate can comprise the advantage that more precise monitoring of the local region can be carried out because the influence of the flatness of the base plate is reduced. The smaller the frustoconical top surface, the more direct the transfer of a deflection of the base plate to the biasing element may be.

In a further embodiment of the present disclosure, the biasing element can comprise a pre-pressing projection. This can be arranged on the side of the biasing element facing the fastening element. When a position switch biasing device is mounted on the position switch, the pre-pressing projection can be in direct contact with the button element. By selecting a press-in distance that extends between the stop surface and the pre-pressing projection in the first direction, the press-in depth or the partially indented state of the button element can be predetermined.

In a further embodiment of the present disclosure, the biasing element can comprise at least one limiting projection directed against the fastening element, which, in interaction with the fastening element, can limit a depression depth of the biasing element relative to the fastening element. The limiting projection can limit the maximum depression depth and can protect the button element from excessive external forces and thus from destruction of internal contact elements and the spring element of the position switch.

In a further embodiment of the present disclosure, the fastening element can comprise a telescopic sleeve and a fastening base. An inner diameter of the telescopic sleeve can be adapted to the button element of a position switch provided for assembly with the position switch biasing device in such a way that it is larger than an outer diameter of the button element. This may allow the button element to be arranged in the interior of the telescopic sleeve, protruding through to the biasing element. The telescopic sleeve therefore can protect the button element from dirt, lubricants and splash water, for example, but also from transverse forces that could act on the button element transverse to the first direction.

In a first variant, the telescopic sleeve can be provided with a guide groove for interaction with the guide lug projection. When the position switch biasing device is assembled, the guide lug of the biasing element can be arranged outside the telescopic sleeve. The guide lug projection can engage in the guide groove. The stop surface mentioned herein preferably can form one of the two ends of the guide groove.

In a second variant, the telescopic sleeve can also be provided with a guide groove for interaction with the guide lug projection. However, when the position switch biasing device is assembled, the guide lug of the biasing element may protrude into the interior space limited by the inner diameter of the telescopic sleeve. The guide lug projection can also engage in the guide groove. The stop surface mentioned herein preferably can also form one of the two ends of the guide groove in the second variant.

In a third variant, a circumferential fastening projection can be arranged on the telescopic sleeve. The fastening projection can be provided, in interaction with the guide lug projection of the biasing element, to limit the displacement path of the biasing element counter to the first direction L. In other words, the fastening projection can provide the stop surface for the guide lug projection. In order for the guide lug projection to meet the stop surface, the fastening projection can protrude in a second direction and the guide lug projection can protrude in a direction counter to the second direction. The second direction can be arranged orthogonal to the first direction.

In a further embodiment of the present disclosure, the orthographic projection of the fastening projection onto an imaginary plane and the orthographic projection of the guide lug projection onto the imaginary plane can overlap each other by at least 80%, wherein the imaginary plane can be arranged orthogonal to the first direction. The smaller of the two orographic projections should always be chosen as the basis for the percentage of coverage.

In a further embodiment of the present disclosure, the biasing element can comprise a threaded insert in which an adjusting screw for adjusting the biased state can be arranged as a pre-pressing projection. The adjusting screw can compensate not only for manufacturing tolerances of the position switch biasing device. In particular, the actual switch travel of the position switch and thus its sensitivity can be set. To prevent the adjusting screw from becoming displaced due to vibrations during operation, it can be secured in the threaded insert after adjustment, for example, using anaerobic adhesives. It is also possible to slightly deform the threaded insert so that a stiff, self-locking screw connection can be created.

To obtain a position sensor with higher sensitivity, a conventional or commercially available position switch can be assembled with a position switch biasing device. For this purpose, the fastening element can be firmly connected to a switch housing of the position switch. The pre-pressing projection of the biasing element, which is connected to the fastening element so as to be linearly displaceable, can be in contact with a button element of the position switch. Due to the geometric conditions, in particular the selected press-in distance, the biasing element can hold the button element of the position switch in a partially indented, biased state without the application of external force. In other words, by mounting the position switch biasing device on the position switch, its button element can be engaged and held in the switch housing counter the spring force of the spring element. The press-in distance can be selected so that the contacts of the position switch are just not yet closed and no flashover of a sensor current applied to the contacts can occur.

Position sensors modified in this way can now be used in an escalator or moving walkway. Such passenger transport systems can comprise a conveyor belt and base plates arranged on both sides of the conveyor belt. To monitor a gap between the base plate and the conveyor belt, the escalator or moving walkway can comprise at least one position sensor of the aforementioned type. This position sensor can be arranged on a side surface of the base plate facing away from the conveyor belt. Preferably, the first direction of the position sensor can be arranged orthogonal to this side surface. The biasing element can also be directed against this side surface. Preferably, the frustoconical top surface of the biasing element can touch the adjacent side surface, but without exerting a force on the biasing element in the normal state. If vibrations during operation cause the position switch to respond, a narrow air gap of, for example, a maximum of 0.4 mm can be provided between the frustoconical top surface of the biasing element and the adjacent side surface when attaching the position sensor.

BRIEF DESCRIPTION OF THE DRAWINGS

Embodiments of the disclosure will be described below with reference to the accompanying drawings. Identical or equivalent features have the same reference signs.

In the drawings.

DETAILED DESCRIPTION

The terminology used is for the purpose of describing particular embodiments only and is not intended to be limiting of the present disclosure. As used herein, the terms “comprising” and the like indicate the presence of specified features, steps, operations, and/or components, but do not preclude the presence or addition of one or more other features, steps, operations, or components.

The terms “length,” “width,” “top,” “bottom,” “front,” “back,” “left,” “right,” “vertical,” “horizontal,” “upper,” “lower,” “inner,” “outer,” etc. indicate the orientation or positional relationship based on the orientation or positional relationship shown in the accompanying drawings and are used only for the purpose of describing the present disclosure and mainly to simplify the description. A device or an element must have a particular orientation, be constructed and operate in a particular orientation, and therefore this information should not be construed as a limitation of the disclosure.

Figure 1:
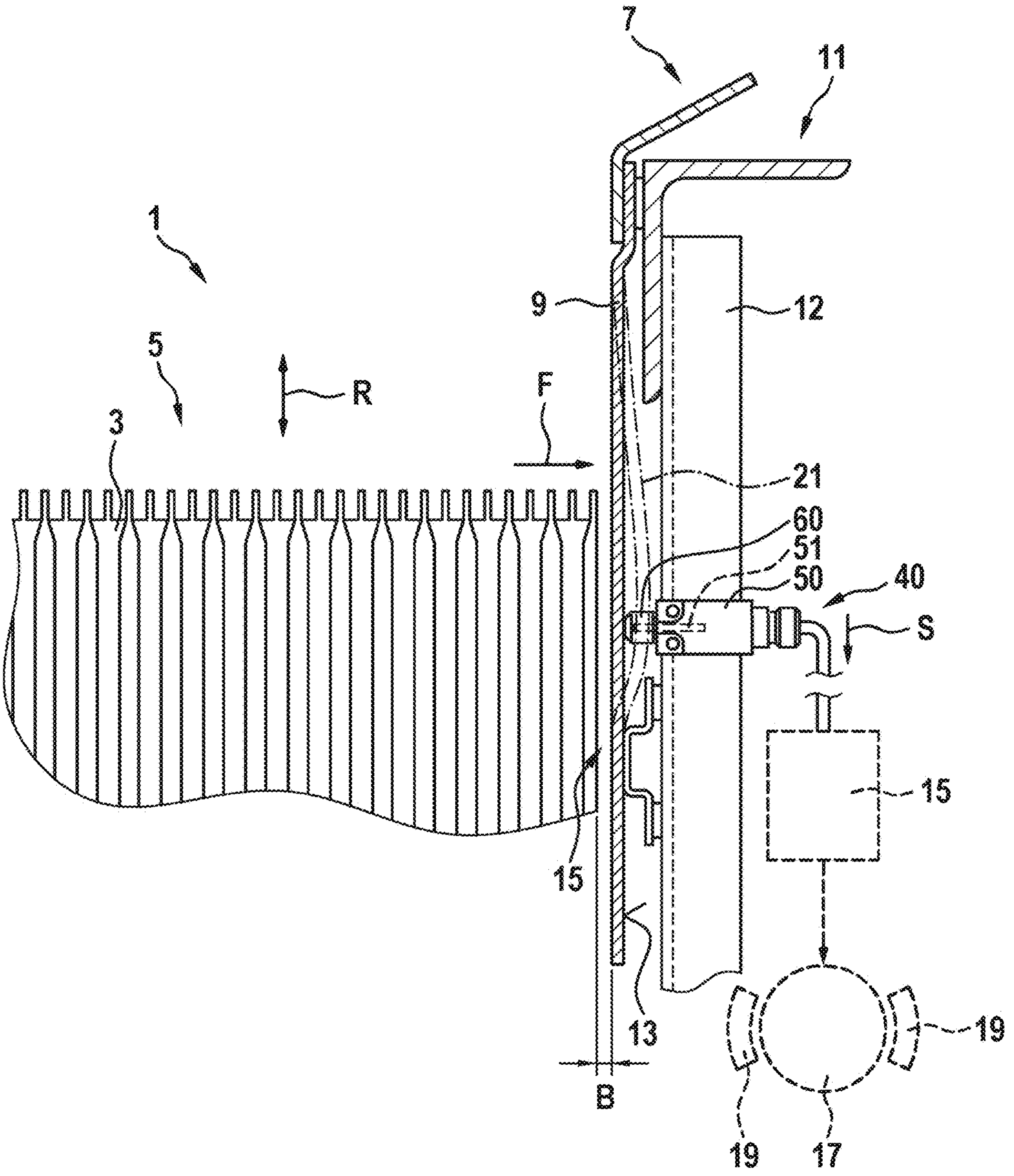
FIG. 1: schematically shows a partial cross section through an escalator, wherein a part of a step and a part of a balustrade base of the escalator are shown in order to show a possible installation of a position sensor according to the disclosure.

FIG. 1 shows schematically a partial cross section through an escalator 1. Their physical structure and mode of action have been known for decades, so that they will not be discussed in detail herein. In this partial cross section, a part of a step 3 of a conveyor belt 5 and a part of a balustrade base 7 of the escalator 1 are shown in order to show a possible installation of a position sensor 40 according to the disclosure. As is known, during operation of the escalator 1, the step 3 or the conveyor belt 5 moves relative to a fixed base plate 9 of the balustrade base 7, which is arranged laterally relative to the conveyor belt 5. According to the applicable standards such as EN-115, the gap width B of the gap 15 required for functional purposes between the base plate 9 and the step 3 must not be larger than 3 mm. This can prevent items such as shoes or fingers of users from being drawn into the gap 15 and causing serious damage. The base plate 9 is made of solid materials such as sheet steel, but due to its sheet-like structure it can be pushed away from the direction of the step 3 into a deformed position 21 shown with a dash-dotted line when a corresponding force F is applied. This results in the width B of the gap 15 becoming larger than 3 mm, which can lead to the accidents mentioned above.

In order to detect deformed layers 21 of the base plate 9, position sensors 40 can be arranged behind the base plate 9 at predetermined intervals along a direction of movement R (not vertical, but actually oblique to the plane of the drawing) of the conveyor belt 5. These position sensors 40 each can comprise a position switch biasing device 60 and a position switch 50, the button element 51 of which can be directed against the base plate 9. In other words, the position sensors 40 can be arranged next to a side surface 13 of the base plate 9 facing away from the conveyor belt 5.

If the button element 51 of the position switch 50 is actuated or engaged to a certain degree due to a deformed position 21 of the base plate 9, an electrical contact 55 in the position switch 50 can close (see FIG. 2), so that a signal current S is transmitted to an escalator control 15 of the escalator 1. In response to this signal current S, the escalator control 15 can disconnect a drive motor 17 of the escalator 1 from the power supply (not shown) and can activate its service brake 19 so that the conveyor belt 5 is stopped.

If during this process the traveled path of the button element 51 is very small and does not close the electrical contact 55, the position switch 50 may also not transmit a signal current S. This means that if the degree of deformation of the base plate 9 is very small and therefore safe, the position switch 50 may not be triggered.

Figure 2:
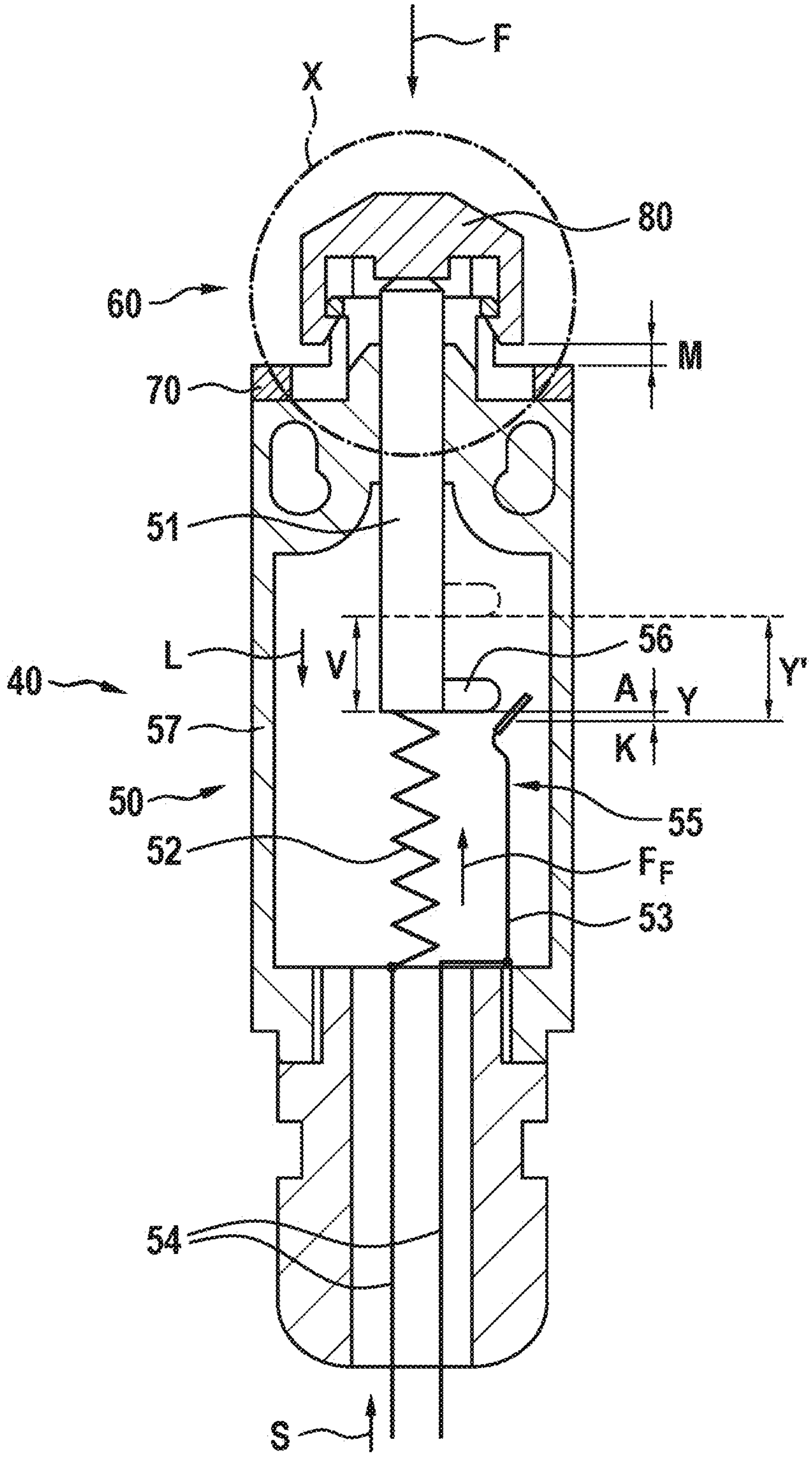
FIG. 2: schematically shows a position sensor with a commercially available position switch and with a position switch biasing device according to a first embodiment.
Figure 3:
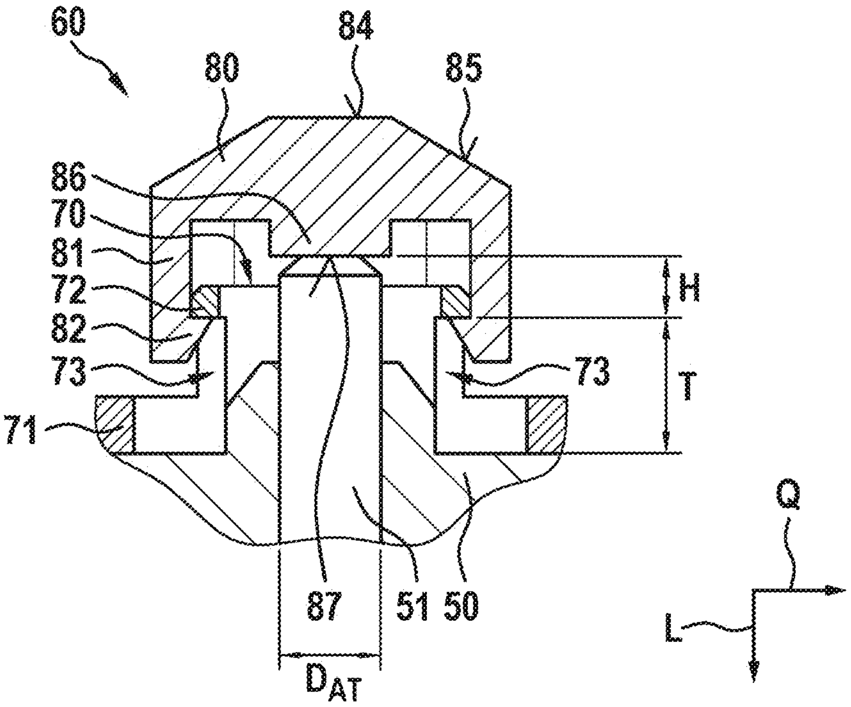
FIG. 3: is an enlarged sectional view of the detail X shown in FIG. 2.
Figure 4:
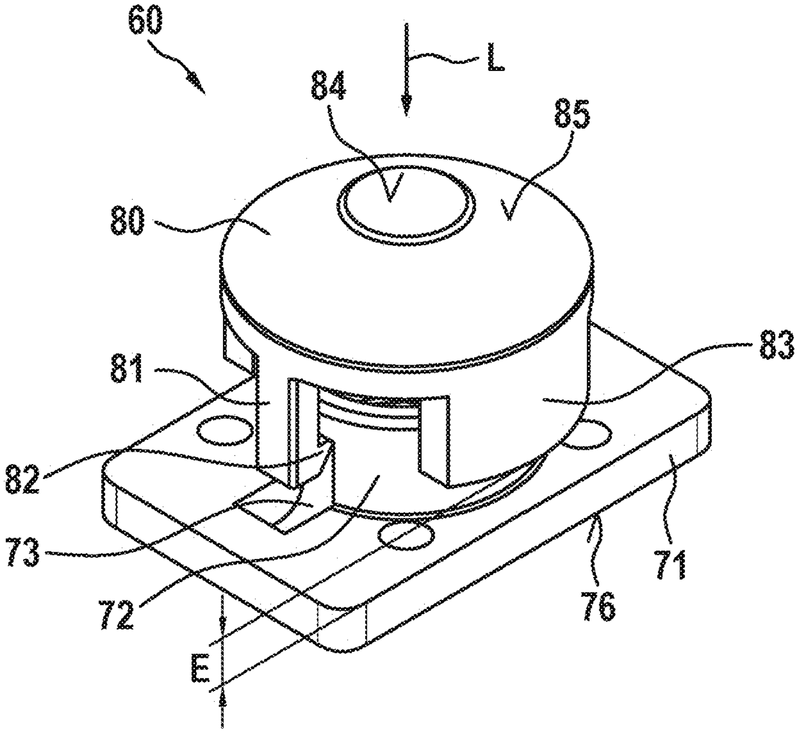
FIG. 4: is a three-dimensional representation of the overall structure of the position switch biasing device according to FIGS. 2 and 3.
Figure 5:
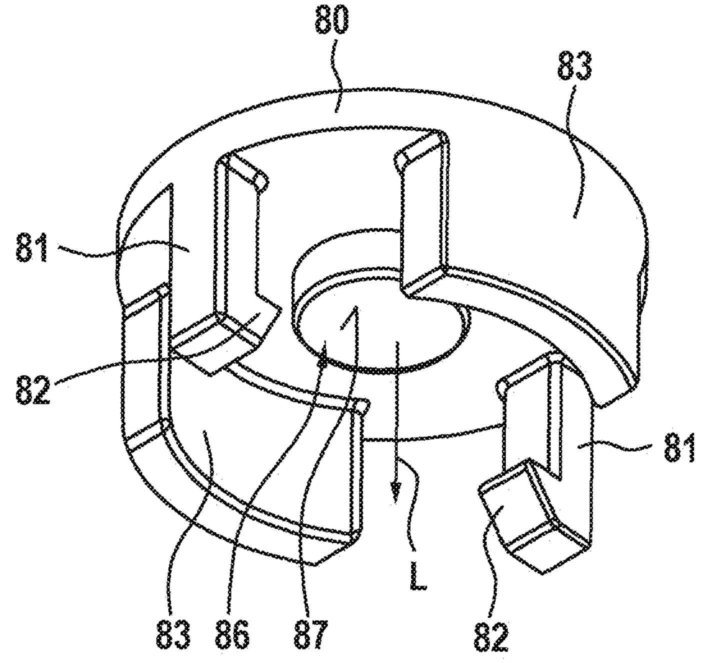
FIG. 5: is a three-dimensional representation of a biasing element of the position switch biasing device shown in FIG. 4.
Figure 6:
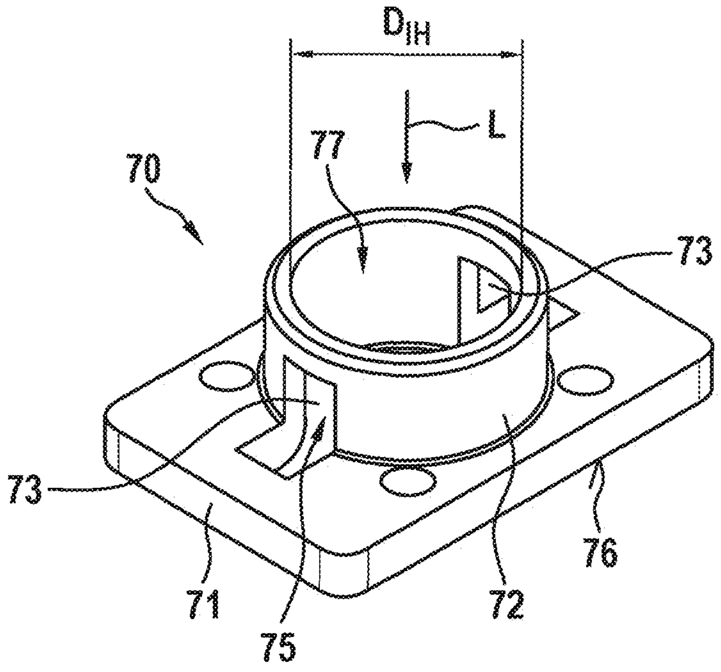
FIG. 6: is a three-dimensional representation of a fastening element of the position switch biasing device shown in FIG. 4.

The most important components of the position switch 50 are shown schematically in FIG. 2. The button element 51 can be held in an OFF switch position A by a spring element 52, the spring force $F_F$ of which can act to counter to a first direction L. The first direction L can indicate the possible displacement direction of the button element 51 from the OFF switch position A to an ON switch position K. The contact 55 mentioned herein can comprise a contact tongue 53 and a contact projection 56 which can be mechanically connected to the button element 51. Two electrical lines 54 can lead into the interior of the position switch 50, wherein one of the two lines 54 can be electrically connected to the contact projection 56 via the spring element 52, and the other of the two lines 54 can be electrically connected to the contact tongue 53. When the button element 51 is actuated or moved to the ON switch position K, the contact projection 56 can touch the contact tongue 53 after traveling the switch travel Y and can electrically connect the two lines 54 to one another, so that the signal current S applied to one of the two lines 54 can flow.

It can also be seen from FIG. 2 that the button element 51 could protrude significantly further from the position switch 50 without the use of a position switch biasing device 60. When the button element 51 is actuated, a significantly longer switch travel Y' could have to be covered before the contact projection 56 touches the contact tongue 53. By attaching a position switch biasing device 60 to a conventional position switch 50, said position switch can respond to significantly smaller deformed layers 21 of the base plate 9 by shortening the original switch travel Y by a biasing distance V. The sensitivity can thereby be increased in proportion to the shortening of the original switch travel Y' to the actual switch travel Y. The biasing distance V may be the difference between the original switch travel Y' and the actual switch travel Y.

FIGS. 2 to 6 show the aforementioned position switch biasing device 60 or its components in a first embodiment, which is why these figures are described together. The position switch biasing device 60 can comprise a fastening element 70 and a biasing element 80. The fastening element 70 can be firmly connected to a switch housing 57 of the position switch 50, for example, with screws or with an adhesive. Clamping elements, press-fit connections, snap connections, welded connections and the like can also be used for this purpose. Depending on the design, the fastening element 70 can be fastened to either side of the position switch 50, as long as the fastening element 70 and the position switch 50 can be securely connected to one another and the biasing element 80 has the correct functional alignment with the button element 51.

The biasing element 80 and the fastening element 70 can be connected to one another so as to be linearly displaceable. In other words, a biasing element 80 arranged on the position switch 50 can be moved telescopically within a predetermined displacement path in the first direction L and in the direction counter thereto. The biasing element 80 can be in contact with the button element 51 of the position switch 50 such that the button element 51 is in a biased state. As soon as a base plate 9 to be monitored is deformed and exerts a force F in the first direction L against the biasing element 80, the button element 51 can be engaged in the direction of the ON position K when the spring force $F_F$ of the spring element 52 is overcome.

The fastening element 70 shown in FIGS. 2 to 6 can comprise a fastening base 71 and a telescopic sleeve 72. Two opposing guide grooves 73 can each extend in the first direction L from a stop surface 75 formed in the telescopic sleeve 72 to a base surface 76 of the fastening base 71 (see FIG. 6). When the position switch biasing device 60 is mounted on the position switch 50, the base surface 76 can rest against the position switch 50. The stop surface 75 can be arranged parallel to the base surface 76 and at a distance T (see FIG. 3).

The biasing element 80 of the position switch biasing device 60 can comprise two parallel projecting guide lugs 81, each with a guide lug projection 82, wherein the two guide lugs 81 can also extend in the first direction L. Each of the guide lug projections 82 can extend in a second direction Q that is orthogonal to the first direction L. The guide lugs 81 can be adapted to the guide grooves 73 in such a way that their guide lug projections 82 can engage in the guide grooves 73 when the position switch biasing device 60 is fully assembled. The guide lug projections 82, in interaction with the stop surface 75 of the respective guide groove 73, can predetermine a maximum distance M (see FIG. 2) of the biasing element 80 to the fastening element 70 and thus can limit its displacement path counter to the first direction L.

Furthermore, the biasing element 80 can comprise two parallel projecting limiting projections 83, wherein the two limiting projections 83 can also extend in the first direction L. The limiting projections 83, in interaction with the fastening base 71 on which they rest after covering a depression depth E, can predetermine a minimum distance of the biasing element 80 from the fastening element 70 and thus can limit its displacement path in the first direction L. The depression depth E may be greater than the actual switch travel Y (see FIG. 2) in order to ensure that in the engaged state the contact projection 56 sufficiently touches or contacts the contact tongue 53.

The biasing element 80 additionally can comprise a pre-pressing projection 86. Its projection surface 87 can be arranged at a distance H from the guide lug projections 82. The projection surface 87 can be provided to abut against the button element 51 when the position switch biasing device is mounted on a position switch 50. As can easily be seen, the biasing distance V (see FIG. 2) can be predetermined by selecting the distance H. In order to be in contact with the projection surface 87, the button element 51 can protrude into an interior space 77 delimited by the telescopic sleeve 72, the inner diameter $D_{IH}$ of which may be larger than an outer diameter $D_{AT}$ of the button element 51.

In the present embodiment, the biasing element 80 can be cylindrical. In addition, the biasing element 80 can be designed as a single part with its guide lugs 81, its limiting projections 83 and the pre-pressing projection 86. The side of the biasing element 80 facing away from the guide lugs 81, the limiting projections 83 and the pre-pressing projection 86 can be frustoconical in shape and thus can comprise a frustoconical top surface 84 and a frustoconical lateral surface 85. The use of the frustoconical top surface 84 with a smaller area for contacting the item under test or the base plate 9 can lead to a more precise monitoring of the local region, because the influence of the flatness of the base plate 9 may be reduced. The smaller the frustoconical top surface 84, the more direct the transfer of a deflection of the base plate 9 to the biasing element 80 may be.

As FIGS. 2 to 6 show as a first variant of the position switch biasing device 60, when the position switch biasing device 60 is assembled, the guide lugs 81 can be arranged outside the telescopic sleeve 72.

Figure 7:
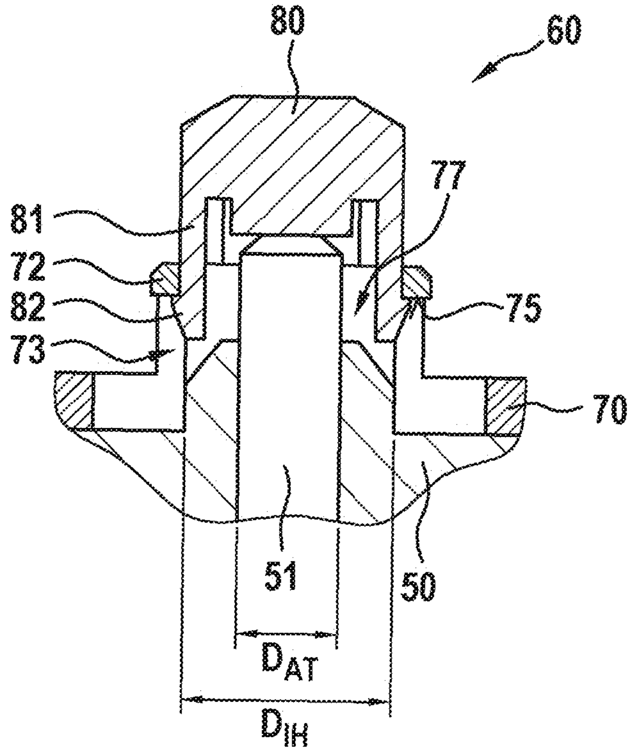
FIG. 7: is a sectional view of a second embodiment of a position switch biasing device.

FIG. 7 shows a second variant of the position switch biasing device 60, the telescopic sleeve 72 of which can also be provided with two guide grooves 73 arranged opposite one another for interaction with the guide lug projections 82. However, if the position switch biasing device 60 of this variant is assembled, the guide lugs 81 of the biasing element 80 can protrude into the interior space 77 delimited by the inner diameter $D_{IH}$ of the telescopic sleeve 72. The guide lug projections 82 can also engage in the respective guide groove 73. The aforementioned stop surface 75 can also form one of the two ends of the guide groove 73 in the second variant.

Figure 8:
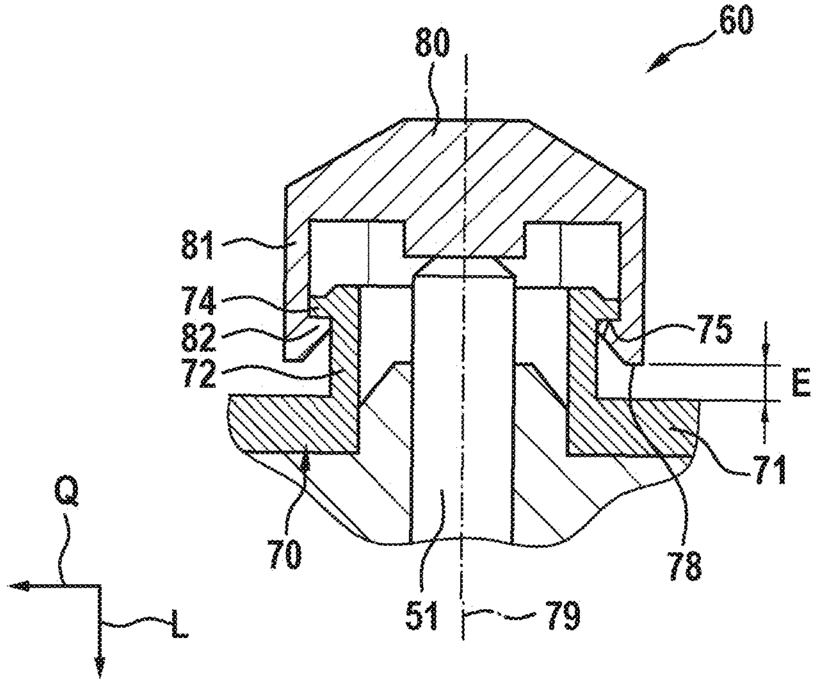
FIG. 8: is a sectional view of a third embodiment of a position switch biasing device.

FIG. 8 shows a third variant of the position switch biasing device 60. A circumferential fastening projection 74 can be arranged on its telescopic sleeve 72. The fastening projection 74 can interact with the guide lug projection 82 of the biasing element 80 and can limit the displacement path of the biasing element 80 counter to the first direction L. In other words, the fastening projection 74 can comprise the stop surface 75 for the guide lug projection 82.

As can be clearly seen from FIG. 8, the fastening element 70 or its telescopic sleeve 72 may comprise no guide grooves and no limiting projections. Due to the absence of guide grooves, the biasing element 80 can be freely rotated about a central longitudinal axis 79 of the telescopic sleeve 72. The function of the limiting projections can be taken over by the two guide lugs 81 in that their ends 78 can be dimensioned such that the depression depth E may be present between them and the fastening base 71 when no force F is acting on the biasing element 80.

In order for the guide lug projection 82 to meet the stop surface 75, the fastening projection 74 can protrude in a second direction Q and the guide lug projection 82 can protrude in a direction counter to the second direction Q. The second direction Q can be arranged orthogonal to the first direction L.

For all the variants of the position switch biasing device 60 mentioned herein, the orthographic projection of the fastening projection 74 or the stop surface 75 onto an imaginary plane (not shown) and the orthographic projection of the guide lug projection 82 onto the imaginary plane can overlap one another, wherein the imaginary plane can be arranged orthogonal to the first direction L.

Figure 9:
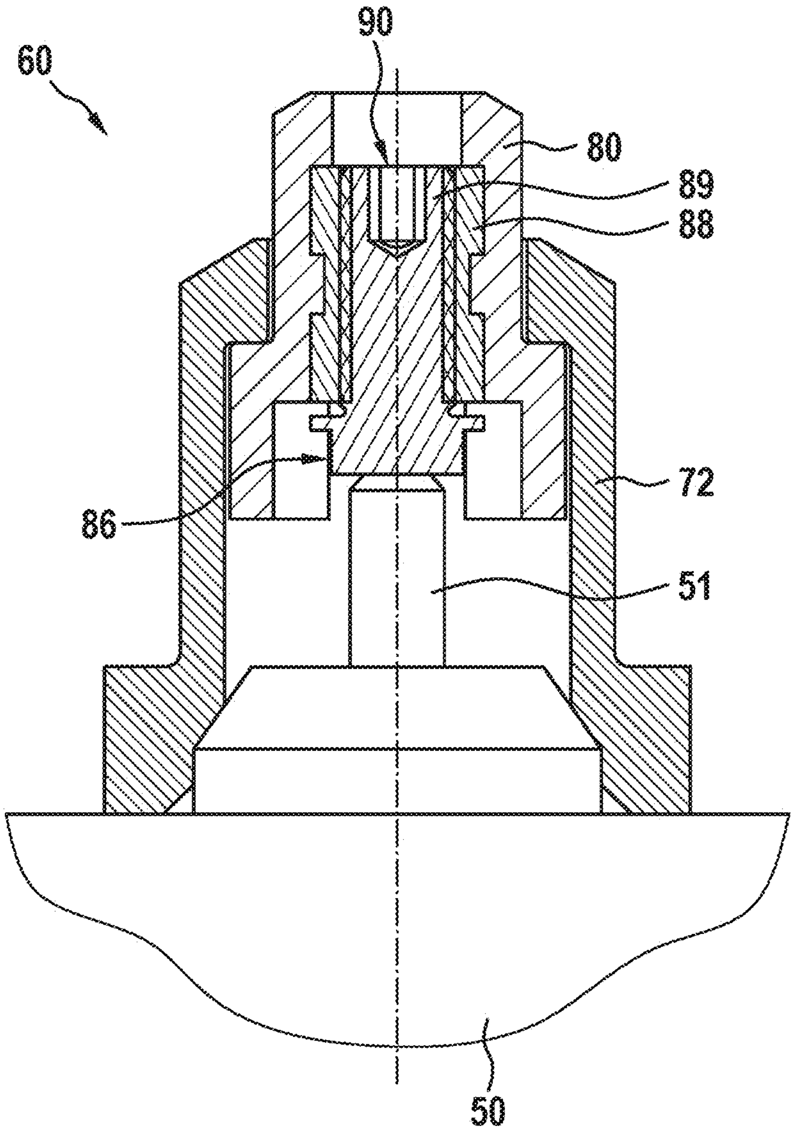
FIG. 9: is a sectional view of a fourth embodiment of a position switch biasing device with an adjusting screw.

FIG. 9 shows a sectional view of a fourth embodiment of a position switch biasing device 60 with an adjusting screw 89. The biasing element 80 can comprise a threaded insert 88 in which the adjusting screw 89 for adjusting the biased state can be arranged as a pre-pressing projection 86. The adjusting screw 89 can compensate not only for manufacturing tolerances of the position switch biasing device 60 but can also adjust the actual switch travel Y (see FIG. 2) of the position switch 50 and thus its sensitivity. To prevent the adjusting screw 89 from becoming displaced due to vibrations during operation, it can be secured in the threaded insert 88 after adjustment, for example with anaerobic adhesives. It is also possible to slightly deform the threaded insert 88 during its manufacture so that a stiff, self-locking screw connection can be created. For adjustment, the adjusting screw 89 can comprise a hexagon socket hole 90 on the end-face side, so that the adjustment can be made using an Allen wrench. Instead of the hexagon socket hole 90, other coupling forms can also be used, for example for slotted screwdrivers, Phillips screwdrivers, hexalobular screwdrivers, triangular wrenches, etc.

Although four variants of the position switch biasing device 60 are shown in FIGS. 1 to 9, it is obvious that the same functional principle of biasing a position switch 50 with a position switch biasing device 60 can also be implemented with differently designed fastening elements 70 and biasing elements 80. For example, the number of guide lugs 81 of a biasing element 80 is not limited to two. In particular, a biasing element 80 and/or a fastening element 70 can also be composed of several parts. Of course, the adjusting screw

89 and the threaded insert 88 can be used in any of the illustrated variants of the position switch biasing device 60. Finally, it should be noted that terms such as "having," "comprising," etc., do not preclude other elements or steps, and terms such as "a" or "one" do not preclude a plurality. Reference signs in the claims should not be considered to be limiting.

The invention claimed is:

1. A position switch biasing device comprising:
   a fastening element for fastening the position switch biasing device to a position switch, wherein the position switch comprises a button element which is configured to be displaceable in a first direction and is held in an OFF switch position by a spring element acting against the first direction; and
   a biasing element, wherein the biasing element is coupled to the fastening element so as to be linearly displaceable and arranged with the position switch such that, when the position switch biasing device is mounted on the position switch, the biasing element is movable telescopically in the first direction of the button element and the biasing element holds the button element of the position switch in a partially indented, biased state without the application of external force,
   wherein the position switch biasing device is configured to couple to a position switch to create a position sensor, wherein the position sensor is configured to monitor a gap between a base plate and a conveyor belt of an escalator or a moving walkway.

2. The position switch biasing device of claim 1, wherein the biasing element comprises at least one guide lug, wherein the at least one guide lug is connected to the fastening element so as to be linearly displaceable and wherein the guide lug comprises a guide lug projection configured to interact with a stop surface of the fastening element to predetermine a maximum distance of the biasing element from the fastening element.

3. The position switch biasing device of claim 1, wherein the biasing element comprises a frustoconical top surface and a frustoconical lateral surface adjoining the frustoconical top surface, wherein the frustoconical top surface and the frustoconical lateral surface are arranged on a side of the biasing element facing away from the fastening element.

4. The position switch biasing device of claim 2, wherein the biasing element comprises a frustoconical top surface and a frustoconical lateral surface adjoining the frustoconical top surface, wherein the frustoconical top surface and the frustoconical lateral surface are arranged on a side of the biasing element facing away from the fastening element.

5. The position switch biasing device of claim 1, wherein the biasing element comprises a pre-pressing projection arranged on a side of the biasing element facing the fastening element and is configured to be in direct contact with the button element when the position switch biasing device is mounted on the position switch.

6. The position switch biasing device of claim 2, wherein the biasing element comprises a pre-pressing projection arranged on a side of the biasing element facing the fastening element and is configured to be in direct contact with the button element when the position switch biasing device is mounted on the position switch.

7. The position switch biasing device of claim 1, wherein the biasing element comprises at least one limiting projection which is directed against the fastening element and is configured to interact with the fastening element to limit a depression depth of the biasing element relative to the fastening element.

8. The position switch biasing device of claim 1, wherein the biasing element comprises at least one limiting projection which is directed against the fastening element and is configured to interact with the fastening element to limit a depression depth of the biasing element relative to the fastening element.

9. The position switch biasing device of claim 1, wherein the fastening element comprises a telescopic sleeve and a fastening base and wherein an inner diameter of the telescopic sleeve is larger than an outer diameter of the button element of the position switch of the position switch biasing device.

10. The position switch biasing device of claim 2, wherein the fastening element comprises a telescopic sleeve and a fastening base and wherein an inner diameter of the telescopic sleeve is larger than an outer diameter of the button element of the position switch of the position switch biasing device.

11. The position switch biasing device of claim 9, wherein the telescopic sleeve comprises a guide groove configured to interact with the guide lug projection, wherein, when the position switch biasing device is mounted, the guide lug of the biasing element protrudes into the interior space delimited by the inner diameter of the telescopic sleeve and the guide lug projection engages in the guide groove.

12. The position switch biasing device of claim 9, wherein the telescopic sleeve comprises a guide groove configured to interact with the guide lug projection, wherein, when the position switch biasing device is mounted, the guide lug of the biasing element is arranged outside the telescopic sleeve and the guide lug projection engages in the guide groove.

13. The position switch biasing device of claim 9, wherein a circumferential fastening projection is arranged on the telescopic sleeve and the circumferential fastening projection is configured to interact with the guide lug projection of the biasing element to limit the displacement path of the biasing element counter to the first direction.

14. The position switch biasing device of claim 13, wherein the fastening projection projects in a second direction and the guide lug projection projects in a direction counter to the second direction, the second direction being orthogonal to the first direction.

15. The position switch biasing device of claim 14, wherein the orthographic projection of the fastening projection onto an imaginary plane and the orthographic projection of the guide lug projection onto the same imaginary plane overlap each other by at least 80%, the imaginary plane being arranged orthogonal to the first direction.

16. The position switch biasing device of claim 1, wherein the biasing element comprises a threaded insert in which an adjusting screw for adjusting the biased state is arranged as a pre-pressing projection.

17. The position switch biasing device of claim 2, wherein the biasing element comprises a threaded insert in which an adjusting screw for adjusting the biased state is arranged as a pre-pressing projection.

18. A position sensor comprising the position switch and the position switch biasing device of claim 1, wherein the fastening element is connected to a switch housing of the position switch and the pre-pressing projection of the biasing element connected to the fastening element so as to be linearly displaceable is in contact with the button element of the position switch wherein the biasing element holds the button element of the position switch in a partially indented, biased state without the application of external force.

19. An escalator or moving walkway with a conveyor belt and a base plate arranged laterally relative to the conveyor belt, wherein the escalator or the moving walkway comprises at least one position sensor of claim 18 for monitoring a gap between the base plate and the conveyor belt and which position sensor is arranged on a side surface of the base plate facing away from the conveyor belt, wherein the first direction of the position switch of the position sensor is arranged orthogonal to this side surface and the biasing element is directed against this side surface.

20. The escalator or moving walkway of claim 19, wherein the biasing element rests with its frustoconical top surface against the side surface of the base plate.

* * * * *